United States Patent [19]

Löfmark

[11] Patent Number: 5,446,787
[45] Date of Patent: Aug. 29, 1995

[54] METHOD FOR AVOIDING SELF-OSCILLATION IN CONJUNCTION WITH ECHO CANCELLATION

[75] Inventor: Bengt G. Löfmark, Skärholmen, Sweden

[73] Assignee: Telefonaktiebolaget LM Ericsson, Stockholm, Sweden

[21] Appl. No.: 44,050

[22] Filed: Apr. 8, 1993

[30] Foreign Application Priority Data

Apr. 9, 1992 [SE] Sweden .............................. 9201145

[51] Int. Cl.⁶ ............................................. H04B 3/20
[52] U.S. Cl. .................................. 379/410; 379/411; 379/406; 370/32.1
[58] Field of Search ............... 379/410, 411, 406, 345, 379/416, 399; 370/32.1, 32; 375/99, 121

[56] References Cited

U.S. PATENT DOCUMENTS

| | | | |
|---|---|---|---|
| 4,670,903 | 6/1987 | Araseki et al. | 379/410 X |
| 4,712,235 | 12/1987 | Jones, Jr. | 379/410 |
| 4,811,261 | 3/1989 | Kobayashi et al. | |
| 4,894,820 | 1/1990 | Miyamoto et al. | |
| 5,111,481 | 5/1992 | Chen et al. | 375/99 X |

OTHER PUBLICATIONS

Abstract of Japanese publication JP 1-007821, published Jan. 11, 1989.
Abstract of Japanese publication JP 1-198154, published Aug. 9, 1989.
William A. Sethares et al., *Bursting in Adaptive Hybrids,* IEEE Transactions on Communications, vol. 37, No. 8, pp. 791–799, Aug. 1989.
Abraham Krieger and Elias Masry, *Constrained Adaptive Filtering Algorithms: Asymptotic Convergence Properties for Dependent Data,* IEEE Transactions on Information Theory, vol. 35, No. 6, pp. 1166–1176, Nov. 1989.
J. W. Cook and R. Smith, *An integrated Circuit for Analogue Line Interfaces With Adaptive Transmission and Extra Facilities,* Br Telecom Technol. J., vol. 5, No. 1, pp. 32–42, Jan. 1987.

*Primary Examiner*—James L. Dwyer
*Assistant Examiner*—Magdy W. Shehata
*Attorney, Agent, or Firm*—Burns, Doane, Swecker & Mathis

[57] ABSTRACT

A method for avoiding self-oscillation in a four-wire loop in conjunction with echo cancellation is effected with the aid of an adaptive filter (15). Self-oscillation is avoided for both long and short connections and also when signalling with narrow-band signals, by restricting the permitted range of the coefficients of the adaptive filter in a manner such that the absolute value of the filter transfer function will be sufficiently small so that amplification in the four-wire loop is less than one. This is achieved by limiting the absolute value of the filter transfer function (1Hcal), to a value which is smaller than a determined function of the echo transfer function ($H_{fa}$) in the far-end of the loop and the echo transfer function ($H_{ne}$) in the near-end of the loop.

36 Claims, 1 Drawing Sheet

METHOD FOR AVOIDING SELF-OSCILLATION IN CONJUNCTION WITH ECHO CANCELLATION

FIELD OF THE INVENTION

The present invention relates to a method for avoiding self-oscillation in a four-wire loop in conjunction with echo cancellation effected with the aid of an adaptive filter.

BACKGROUND

In telecommunication systems in which adaptive echo cancellation is effected with the aid of an adaptive filter in a four-wire loop, in certain operational cases problems occur with self-oscillation, called "bursting". This phenomenon is caused by the presence in the four-wire loop of feedback from the output of the adaptive filter to its input, via the far-end of the loop. In this way, a near-end signal is able to pass around the loop and appear as a far-end signal at the filter input and thereby influence the setting of the adaptive filter. The risk of self-oscillation is greater in the case of shorter connections, for instance when so-called adaptive hybrids are used, than in the case of longer connections, for instance when so-called trunk echo cancelers are used. This is because the near-end signal passing around the loop is decorrelated as a result of the large delay that occurs in long connections.

The "bursting" phenomenon and a method of reducing the risk of "bursting", i.e. self-oscillation, is described in W. A. Sethares, C. R. Johnson J. R. and C. E. Rohrs: "Bursting in Adaptive Hybrids", IEEE Transactions on Communications, Vol. 37, No. 8, August 1989, pages 791–799.

According to the known method a so-called double-talk detector is used and the updating of an adaptive filter used for echo cancellation is interrupted when signals from a near-end are detected. The method can be relatively successful in the case of trunk echo cancelers which are localized in a network so that the echo path will be relatively heavily attenuated, e.g. more than 6 dB. However, attenuation of the echo is poorer in the case of an adaptive hybrid which lies in the actual 2/4-wire transition, and consequently the detector has a more difficult task. Furthermore, there is a risk that any self-oscillation will be interpreted as a strong near-end signal, causing updating to be interrupted. In this case, any self-oscillation that had commenced would become permanent, which is unacceptable.

It has also been found that when the signals are narrow band signals, e.g. when they are comprised of pure tones, a weak near-end signal may also have a pronounced disturbing effect on the adaptive filter, and therewith result in self-oscillation. Tone signalling is found, for instance, in modem traffic. Consequently, when applying the known method there is a risk that self-oscillation cannot be avoided when transmitting narrow band signals.

Another method for avoiding self-oscillation in conjunction with echo cancellation is described in J. W. Cook and R. Smith: "An integrated circuit for analogue line interfaces with adaptive transmission and extra facilities", British Telecom. Technol J., Vol 5, No. 1, January 1987, pages 32–42. According to this method, the adaptive filter is comprised of one of 24 predetermined filters. However, this merely provides highly limited possibilities of effectively canceling echoes. Consequently, it is probable that the method can only be used for adaptive hybrids, due to the relatively low requirement of echo cancellation that then exists.

It is also known, in conjunction with adaptive control, to enhance the stability of an adaptive system by limiting the permitted range for the coefficients of an adaptive filter. In this regard, it is necessary to be aware of the requirements that the adaptive filter must fulfil in order for the system to be stable, and to ensure that the coefficients are restricted in a manner which will fulfil these requirements. When the requirements for preventing self-oscillation are known and can be transferred to the coefficient space, i.e. to the value of the coefficients, it is possible, of course, to guarantee stability. However, a difficulty resides in finding a criterion which can readily be transformed to the coefficient space and which does not require undue calculation and which will not excessively restrict the permitted range. Excessive limitation of the range would unnecessarily impair performance under the normal conditions in which no such limitation is required.

One example of the restriction of the permitted range for filter coefficients is found described in A. Krieger and E. Masry: "Constrained Adaptive Filtering Algorithms: Asymptotic Convergence Properties for Dependent Data", IEEE Transactions on Information Theory, Vol. 35, No. 6, November 1989, pages 1166–1176.

SUMMARY OF THE INVENTION

The object of the present invention is to provide a method of avoiding self-oscillation in a four-wire loop in conjunction with echo cancellation with the aid of an adaptive filter. The method is effective in both long and short connections and also when signalling with narrow-band signals. This is achieved by restricting the permitted range of the coefficients of the adaptive filter in a manner such that the absolute value of the filter transfer function will be sufficiently small, causing the amplification in the four-wire loop to be less than one.

In addition, particular methods are proposed for limiting the filter coefficients in a manner such that the aforesaid method only requires a moderately demanding calculation.

The invention is characterized by the features set forth in the following claims.

BRIEF DESCRIPTION OF THE DRAWINGS

The present invention will now be described in more detail with reference to the accompanying drawings, in which.

DETAILED DESCRIPTION

Figure 1:
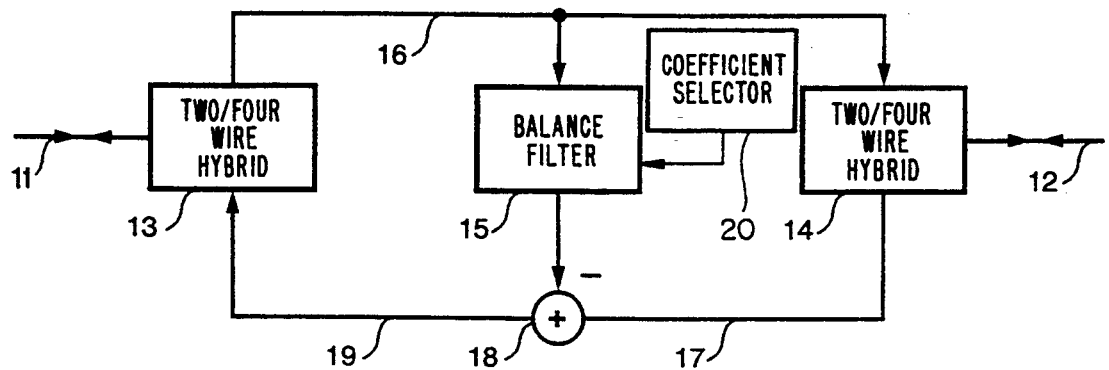
FIG. 1 is a block diagram illustrating a four-wire loop which includes a trunk echo canceller.

FIG. 1 is a block diagram which shows an example of a four-wire loop incorporating an echo canceler which may function, for example, as a so-called trunk echo canceler. Reference numerals 11 and 12 identify a two-wire line at a far-end and at a near-end respectively. Each of the lines is connected to a respective two/four-wire hybrid 13 and 14. The echo canceler includes a digital adaptive filter 15 which is normally referred to as a balance filter in connection with echo canceling. Coefficients for the balance filter are provided by the coefficient selector 20. Selection of coefficients is made by the coefficient selector 20 in accordance with the teachings disclosed here. The filter 15 is coupled between a branch 16 with the transmission direction to the right, and branches 17, 19 with the transmission direction to the left. An echo estimate is formed in the filter 15 and subtracted from a signal in the branch 17 in a subtraction means 18.

Figure 2:
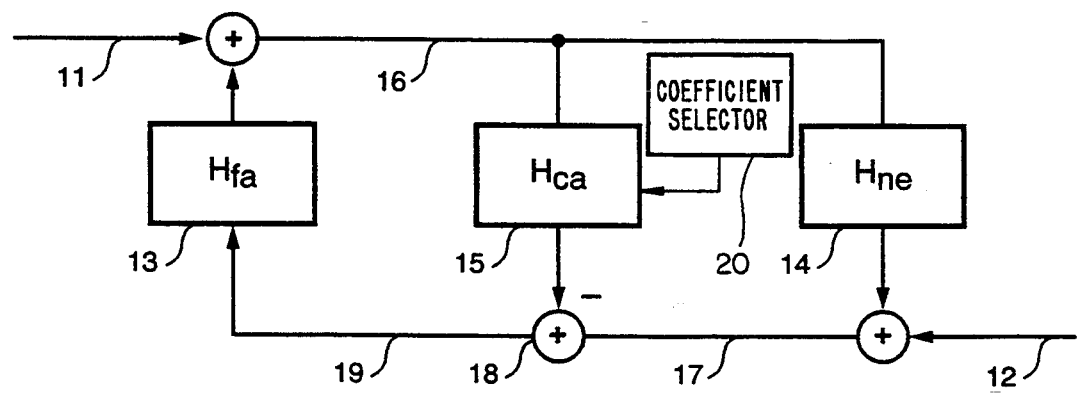
FIG. 2 is a block diagram equivalent to the block schematic shown in FIG. 1.

FIG. 2 illustrates a block diagram which is equivalent to the schematic shown in FIG. 1 and in which the transfer functions of different blocks have been marked. The same reference numerals as those used in FIG. 1 have also been used in FIG. 2. The echo transfer functions for the two/four-wire hybrids 13, 14 and the transfer function for the balance filter 15 are called $H_{fa}$, $H_{ne}$ and $H_{ca}$, which stand for $H_{far}$, $H_{near}$ and $H_{cancel}$ respectively.

A trunk echo canceler is normally placed at a location where echo loss is greater than 6 dB. Consequently, in one such particular case the following will apply for the echo transfer function j at the near-end:

$$|H_{ne}| \leq 0.5 \quad (1)$$

and at the far-end:

$$|H_{fa}| \leq 0.5 \quad (2)$$

The resultant echo transfer function $H_{re}$ for the hybrid 14 and the balance filer 15 is:

$$H_{re} = H_{ne} - H_{ca} \quad (3)$$

A sufficient condition for the stability is that the amplification in the four-wire loop is smaller than one, which gives:

$$|H_{fa}*(H_{ne}-H_{ca})| = |H_{fa}|*|H_{ne}-H_{ca}| < 1 \quad (4)$$

Equation (4) together with equation (2) gives:

$$|H_{ne}-H_{ca}| < 2 \quad (5)$$

However the following applies:

$$|H_{ne}-H_{ca}| \leq |H_{ne}| + |H_{ca}| \quad (6)$$

Equation (4) together with equation (6) gives the following stability condition:

$$|H_{ca}| < 1/|H_{fa}| - |H_{ne}| \quad (7)$$

Equation (7) thus gives a general and adequate stability condition for an echo canceler according to FIGS. 1 and 2. This condition will guarantee stability when the absolute value of the balance filter transfer function is limited to being smaller than a given function of the echo transfer function in the far-end of the loop and in its near-end. One method of guaranteeing that $|H_{ca}|$ is restricted is to calculate the value of $|H_{ca}|$, for instance by fourier transformation, and if this value is too large, then multiplying all of the coefficients in $H_{ca}$ with one and the same positive number which is smaller than one, so as to return $|H_{ca}|$ to the permitted range.

In the particular case according to equations (1) and (2), an adequate stability condition is:

$$|H_{ne}| + |H_{ca}| < 2 \quad (8)$$

With regard to equation (1), this condition is always fulfilled when $$|H_{ca}| < 1.5 \quad (9)$$

In order to ensure safely that the stability condition will be fulfilled, it is sufficient to satisfy equation (7). Naturally, it is possible to calculate $|H_{ca}|$ and to interrupt updating of the balance filter when the equation (7) is not satisfied. The calculations required to do this, however, are excessive, since it involves a fourier transformation of the transfer function. Furthermore, an interruption in the updating of the balance filter means that an optimum cannot definitely be achieved, with regard to the boundary condition. Instead of reaching an optimum, the updating may be interrupted when reaching the boundary according to equation (7).

Suggested below are methods which require less demanding calculations than the aforesaid fourier transformation and which result in the definite achievement of an optimum with regard to the boundary condition, and according to which the filter coefficients are returned automatically to the permitted range should they assume random values for some reason or other, for instance as a result of disturbance on the supply voltage.

The most common type of adaptive filter in an echo canceler is an FIR-filter. This filter has the following transfer function:

$$H_{ca} = \Sigma\{b_\nu * z^{-\nu}\} \quad (10)$$

where $b_\nu$ represents the adaptive coefficients and $z = e^{j\omega T}$. In the expression for z, $T = 1/f_s$, where $f_s$ is the sampling frequency.

The following relationship always applies: $|z| = 1$. The following relationship therefore applies for the transfer function $H_{ca}$:

$$|H_{ca}| \leq \Sigma |b_\nu| \quad (11)$$

which shows that when the coefficients are restricted during the updating process in accordance with $$|H_{ca}| \leq \Sigma |b_\nu| \leq 1.5 \quad (12)$$

the stability condition will be fulfilled. It should be noted that the value 1.5 is appropriate for a trunk echo canceler. Another value which fulfills the conditions according to equation (7) should be chosen in other applications.

The condition according to equation (12) is simple to calculate, since it solely requires a summation of the absolute values of the coefficients.

The equals sign in equation (11), i.e. Max $|\Sigma\{b_\nu * z^{-\nu}\}| = \Sigma |b_\nu|$ applies, inter alia, in the following cases:

Only one coefficient is different from zero (all frequencies).

All coefficients have the same sign (f=o, i.e. direct current).

Each alternate coefficient is negative ($f = f_s/2$).

Each alternate coefficient is zero and each alternate coefficient of the remainder is negative and each alternate coefficient positive ($f = f_s/4$).

It has been found that cases similar to those above can occur when both the near-end signals and the far-end signals consist of pure tones. The requirement for a summation of the absolute values is thus not unrealistically hard, but must generally be fulfilled in order to guarantee stability.

It is desirable to attain an optimum as quickly as possible even when introducing a boundary condition, even though this optimum lies on the boundary. By calculating the new values of the coefficients when updating the adaptive filter and not proceeding with the updating when these new values do not fulfil the condition, the result, under all circumstances, will be a slow convergence on the boundary and perhaps prevent an optimum being achieved. Such a method is therefore unsuitable. In order to guarantee a rapid convergence and to achieve an optimum it is desirable that the influence of the updating procedure performed on the basis of different boundary conditions is perpendicular thereto.

The most common adaptive filter updating method is the LMS-method. When practicing this method, the filter coefficients are updated in accordance with the following equation:

$$b_v(k+1) = b_v(k) + u^* x_v(k)^* e(k+1) \quad (13)$$

where $x_v(k)$ is the signal and $e(k+1)$ is the error, this updating process endeavoring to reduce the correlation between said signal and said error, and u is an updating constant which determines the speed and the accuracy of the updating process. Variants of this algorithm in which the error sign and/or the signal sign are used are also common.

One method of obtaining rapid convergence and an influence which is perpendicular to the boundary condition when using the limit value according to equation (9) is to proceed as follows. A check is made in conjunction with each updating process to ascertain whether the boundary condition has been fulfilled or not.

Form E in accordance with:

$$E = \Sigma |b_v| - B_{sum} \quad (14)$$

where $B_{sum}$ corresponds to the limit value 1.5 in equation (9).

When E is greater than 0, updating is effected in accordance with the following equation:

$$b(k+1) = b(k) - SIGN[b_v(k)]^* E/Nv + u^* x_v(k)^* e(k+1) \quad (15)$$

where Nv is the number of coefficients and SIGN[$b_v(k)$] is the sign of the coefficient. Equation (15) implies that the coefficients are returned to the permitted range at right angles to the condition according to equation (14).

If E is smaller than 0, updating is effected in a usual manner according to equation (13).

Equation (15) is very similar to the normal updating equation, i.e. equation (13), and implies that the absolute sum of each coefficient is reduced by an equally large sum. If so desired, the equation (15) can be modified in a normal manner to obtain the sign algorithm or sign-/sign-algorithm. The additional calculation required is moderate and the factor E/Nv is the same for all coefficients and need therefore only be calculated once with each updating process and then added to or subtracted from each coefficient, depending on the sign of the coefficient.

The updating algorithm according to equation (15) returns the coefficients to the permitted range in one step when all $$|v_v| > E/Nv \quad (16)$$

However, should one or more coefficients not fulfil the condition according to equation (16), these coefficients will be updated to opposite signs and thereafter slowly converge to zero with changing signs. This is unsuitable because the more coefficients that lie close to zero the slower the convergence towards the desired range. If all coefficients are almost zero with the exception of one, the error will first increase and then decrease with each updating process by a factor 1−2/Nv. When there is a large number of coefficients, a very slow convergence will result. In this case, an updating algorithm according to equation (29) below can be used, this algorithm not exhibiting this convergence problem. However, a true optimum is not achieved when this lies on the border of the limitation condition.

A limitation of the range in which the coefficients are permitted to move in accordance with the aforegoing, will, of course, also imply a limitation to the possible extent of echo cancellation. The following will apply when canceling the echo of one side, i.e. the near-end echo:

$$H_{ne} + H_{ca} = 0 \quad (17)$$

Thus, with regard to equation (1) the transfer function of an echo canceler must be capable of fulfilling the following conditions in order to be able to cancel all conceivable echo paths:

$$\text{Max}(|H_{ca}|) \leq 0.5 \quad (18)$$

In order to be able to cancel the one echo path and not induce self-oscillation in the four-wire loop, the transfer function of the echo canceler must therefore be capable of fulfilling the following conditions:

$$0.5 \leq \text{Max}(|H_{ca}|) \leq 1.5 \quad (19)$$

A calculation of the impulse response of two PCM-filters plus a highpass filter in cascade with end terminals corresponding to USA's nominal impedance and loaded and non-loaded cable with the subsidiary condition that the total loss is greater than 6 dB has resulted in a sum which is smaller than 1.5 in all three cases. Investigations indicate that the requirement of suppressing the echo and also the stability against self-oscillation are both achieved with the proposed method. When the limit value chosen is greater than 1.5, stability against self-oscillation cannot be strictly proven, but the probability of self-oscillation occurring is considerably lower than if there was no limitation of the transfer function. This particularly applies to the case when "double-talk"-detectors are used to prevent updating from taking place solely with respect to a near-end signal.

Figure 3:
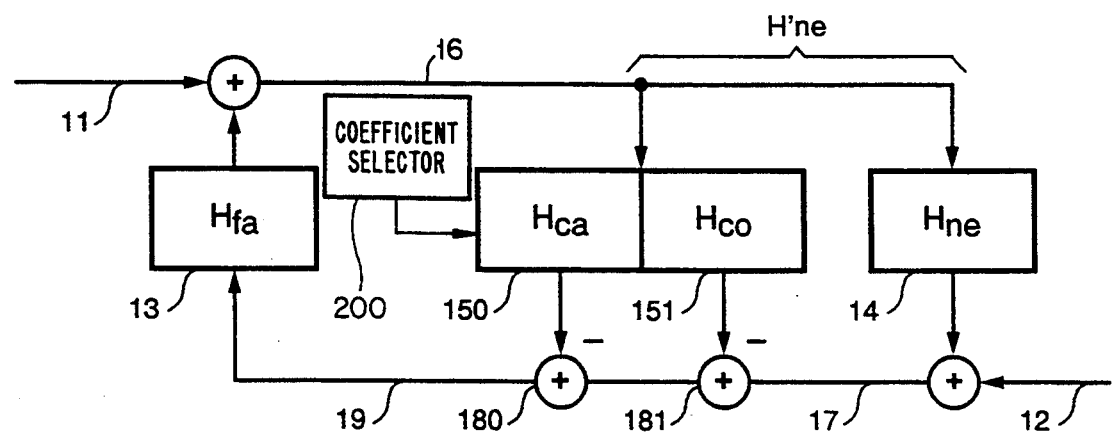
FIG. 3 illustrates an equivalent block diagram for a four-wire loop which incorporates an adaptive hybrid.

FIG. 3 illustrates an example of an equivalent block diagram illustrating a four-wire loop having an echo canceler in the form of an adaptive hybrid. This block diagram includes a balance filter which is located much closer to the near-end hybrid, e.g. on the same circuit board as said hybrid, than is normal in the case described above. Those components and transfer functions which have correspondence in FIGS. 1 and 2 have been identified in the same manner as in the earlier case. The balance filter is divided into an adaptive part 150 having the transfer function $H_{ca}$ and a fixed, non-adaptive part 151 having the transfer function $H_{co}$. Coefficients for the adaptive part 150 of the balance filter are provided by the coefficient selector 200, which selects coefficients in accordance with the teachings disclosed here. The output from the adaptive part 150 of the balance filter is connected to a subtraction means 180, whereas the output from the fixed part 151 of said filter is connected to a subtraction means 181. The fixed filter part is a non-adaptive path, which, for instance, corresponds to the echo when the line is terminated with the nominal impedance of the line circuit, whereas the adaptive filter part can be considered in the same manner as the balance filter 15 in the example illustrated in FIGS. 1 and 2. The resultant echo transfer function downstream of the adaptive filter part 150, i.e. for the near-end hybrid 14 and the fixed filter part 151, has been marked symbolically with the reference sign $H'_{ne}$ in FIG. 3 and can be said to correspond to $H_{ne}$ in FIG. 2, whereas the adaptive filter part, $H_{ca}$, correspond to $H_{ca}$ in FIG. 2.

The relationship $$H'_{ne} = H_{ne} - H_{co} \qquad (20)$$

applies for $H'_{ne}$.

In this case, a general stability condition corresponding to the condition according to equation (7) for the echo canceler 15 in accordance with the aforegoing is:

$$|H_{ca}| < 1/|H_{fa}| - |H'_{ne}| \qquad (21)$$

When $H'_{ne}$ is replaced in accordance with equation (20) the general condition can instead be written as:

$$|H_{ca}| < 1/|H_{fa}| - |H_{ne} - H_{co}| \qquad (22)$$

Thus, in this case, stability is guaranteed because the absolute value of the transfer function of the adaptive filter part is caused to be smaller than a given function of the echo transfer function in the far-end of the loop and the resultant echo transfer function downstream of the adaptive filter part, i.e. for the fixed filter part together with the echo transfer function in the near-end of the loop. The condition according to equation (7) is actually a special case of the condition according to equation (22), since the balance filter 15 of the embodiment illustrated in FIGS. 1 and 2 does not include a non-adaptive part.

Some differences exist with respect to the case according to FIGS. 1 and 2. One difference is that echo loss in the near-end can be lower than 6 dB, possibly only one or two dB. Another difference is that the total echo loss required is much lower, since the adaptive hybrid need only be as good as or only slightly better than a suitable compromise balance, which implies loss of the echo by slightly more than 10 dB. Furthermore, loss of the echo in the far-end may also be lower than 6 dB, particularly in the USA where one and the same input and output level is used in a local station, so that no loss occurs in the four-wire loop.

When taken together, these differences imply that a limit value lower than 1.5 must be used for the sum of the absolute values of the coefficients in order to guarantee stability. This is also possible, due to the smaller demand on echo loss in this application, and because the echo frequency response is smoother. It has been found that the echo loss requirement can be fulfilled when a limit value of about 0.7 is chosen.

For instance, the following relationships apply when the echo loss in the near-end and the far-end are greater than 3 dB, and when $B_{sum} \leq 0.7$:

$|H'_{ne}| \leq 0.707$, $|H_{fa}| \leq 0.707$ and $|H_{ca}| \leq 0.7$, which give:

$$|H_{fa}|*(|H'_{ne}| + |H_{ca}|) \leq 0.707*(0.707 + 0.7) < 1$$

which results in stability, since the loop amplification is lower than one.

Several alternative methods are conceivable for limiting the filter coefficients in the cases aforedescribed. One possibility is to use a weighted sum in accordance with the following:

$$\Sigma |q_v * b_v| \leq B_{sum} \qquad (23)$$

where $q_v$ represents weighting factors.

In this case, the following updating algorithm can be used in order to influence updating perpendicularly to the border condition:

$$b_v(k+1) = b_v(k) - SIGN[b_v(k)]*E/(q_v*Nv) + u*x_v(k)*e(k+1) \qquad (24)$$

Another possibility is the following. When the adaptive filter also includes an IIR-part, i.e. a recursive part, e.g. having the following transfer function:

$$H_{ca} = \Sigma\{b_v*z^{-v}\} + z^{-(Nv+1)}*\Sigma\{c_w/(1 + a_w*z^{-1})\} \qquad (25)$$

where $c_w$ represents coefficients in the recursive part, and $a_w$ represents the recursive pole positions, the following will apply:

$$|H_{ca}| \leq \Sigma|b_v| + \Sigma\{|c_w|/(1|a_w|)\} \qquad (26)$$

which gives the condition:

$$\Sigma|b_v| + \Sigma\{|c_w|/(1 - |a_w|)\} \leq B_{sum} \qquad (27)$$

Equation (27) resembles equation (23). A suitable updating of the c-coefficients is obtained in accordance with the following equation:

$$c_w(k+1) = c_w(k) - SIGN[c_w(k)]*E*(1 - |a_w|)/N-v + u*x_w(k)*e(k+1) \qquad (28)$$

Alternatively, the transfer function can be realized in accordance with:

$$H_{ca} = \Sigma\{b_v*z^{-v}\} + z^{-(Nv+1)}*\Sigma\{c_w*(1-|a_w|)/(-1+a_w*z^{-1})\} \qquad (29)$$

wherein the same updating as that achieved according to equation (15) can be used for $b_v$ and $c_w$.

A third possibility is to apply non-perpendicular updating. The same limitation of the transfer function can be obtained by using the aforesaid criteria but with another updating algorithm. However, the convergence along the boundary condition is changed so that true optimum cannot be achieved. However, such a method may be applied to advantage, when it reduces calculation requirements. An example of one such updating algorithm is given below.

A multiplier is formed, $Mult = 1 - E/B$, where E is formed in accordance with equation (14). The multiplier is truncated to zero if it becomes negative and is set to one for negative values of E. Updating is effected in accordance with the following equation:

$$b_v(k+1) = b_v(k)*Mult + u*x_v(k)*e(k+1) \qquad (30)$$

In equation (30) all coefficients are multiplied by the same factor. This implies that if the condition $E<0$ is not fulfilled, there is introduced a leakage of such large magnitude as to return the coefficients to the permitted range. It can be mentioned that leakage is a measure used to achieve stabilization, in that in the updating process the adaptive coefficients are given a contribution which moves them towards zero or some other predetermined value. Multiplication of the coefficients by the same factor may, for instance, be advantageous when the sign operator is lacking among the routines of the signal processor. If optimum lies outside the boundary condition, updating will proceed towards that point on the border where the direction to the origin of the coordinates is perpendicular to the level curve of the error criterium.

An alternative method, which is particularly beneficial when the filter has many coefficients, is to introduce a new, common coefficient and to multiply the total signal by this common coefficient. The transfer function for $H_{ca}$ will then be:

$$H_{ca} = b_{com} * \Sigma\{b_v * z^{-v}\} \quad (31)$$

where $b_{com}$ is normally 1.0 but is reduced when E is greater than zero.

The coefficients $b_v$ are updated in the usual manner, irrespective of the stability condition, whereas $b_{com}$ is multiplied by Mult when E is greater than zero. However, it is necessary to return $b_{com}$ to the value 1.0, which is its normal state value This can be achieved by adding a small number "e" when the coefficient is smaller than one. Updating of $b_{com}$ is then:

$$b_{com}(k+1) = Mult * b_{com}(k) + e \text{ for } E>0 \quad (32)$$

and $$b_{com}(k+1) = b_{com}(k) + e \text{ for } E<0 \quad (33)$$

when $b_{com}$ is limited so as to be smaller than or equal to 1.0.

It is well known that self-oscillations will occur most readily in the four-wire loop at frequencies close to the band edges, because echo loss is poorest at these frequencies. Consequently, it is advisable to check the conditions at the band-edge frequencies with extra care. As will be evident from the aforegoing, simple conditions prevail between the coefficients and the absolute value of the transfer function at given frequencies, primarily at the frequency zero and at half the sampling frequency. Since these frequencies lie very close to the band edges, separate criteria for these frequencies can be used, whereby the region for the transfer function in precisely these frequency ranges can be further restricted.

When $f=0$: $|\Sigma\{b_v * z^{-v}\}| = |\Sigma\{b_v\}| \quad (34)$

When $f=f_s/2$: $|\Sigma\{b_v * z^{-v}\}| = |\Sigma\{b_v*(-1)^v\}| \quad (35)$

For these frequencies it is possible to use a stricter criterion than that used for $\Sigma|b_v|$ without reducing the possibility of obtaining desired echo cancellation. For instance, if a separate criterion, called $B_{sum\ 0}$ is used at the frequency $f=0$, the following procedure is followed when updating perpendicularly:

Form E according to: $E = \Sigma\{b_v\} - B_{sum\ 0}$

If E is greater than 0, updating is effected according to:

$$b_v(k+1) = b_v(k) - E/Nv + u * x_v(k) * e(k+1) \quad (36)$$

When E is smaller than 0, a new value of E is formed according to:

$$E = \Sigma\{b_v\} + B_{sum\ 0}$$

If the new value of E is smaller than 0, updating is effected according to equation (36).

If E is greater than 0, updating is effected in the usual manner, i.e. according to equation (13).

Updating can also be effected in the same manner as that described with reference to equations (30)–(33).

As will be understood from the above description referring to equation (16), a slow convergence can occur in some cases. In view of this, it may be beneficial to ensure that no individual coefficient has an absolute value which is greater than $B_{sum}$. In this way, a slow convergence is avoided when all coefficients are close to zero with the exception of one coefficient. This can be achieved either by trunking or by updating.

I claim:

1. In a system including a four-wire loop coupled to an echo canceler, the echo canceler including an adaptive filter, a method for controlling the echo canceler to avoid self-oscillation in the system, comprising the steps of:

determining coefficients for use in the adaptive filter in a manner such that an absolute value of a filter transfer function, ($|H_{ca}|$), satisfies a relationship $|H_{ca}| < 1/|H_{fa}| - |H_{ne}|$, where $H_{fa}$ is an echo transfer function in a far-end of the four-wire loop and $H_{ne}$ is an echo transfer function in a near-end of the four-wire loop; and controlling the adaptive filter by applying the determined coefficients thereto.

2. A method according to claim 1, wherein the step of determining coefficients includes limiting a sum of absolute values of coefficients ($\Sigma|b_v|$).

3. A method according to claim 1, wherein the step of determining coefficients includes limiting a weighted sum of absolute values of coefficients ($\Sigma|q_v * b_v|$).

4. A method according to claim 1, wherein the step of determining coefficients includes limiting an absolute value of a sum of coefficients ($|\Sigma b_v|$).

5. A method according to claim 1, wherein the step of determining coefficients includes limiting an absolute value of a sum of products, the products comprising coefficients alternately multiplied by values equal to one and minus one ($|\Sigma\{b_v*(-1)^v\}|$).

6. A method according to claim 1, wherein the step of determining includes reducing values of previously determined coefficients.

7. In a system including a four-wire loop coupled to an echo canceler, the echo canceler including an adaptive filter part and a non-adaptive filter part, a method for controlling the echo canceler to avoid self-oscillation in the system, comprising the steps of:

determining coefficients for use in the adaptive filter part in a manner such that an absolute value of a transfer function, ($|H_{ca}|$), of the adaptive filter part satisfies a relationship $|H_{ca}| < 1/|H_{fa}| - |H_{ne} - H_{co}|$, where $H_{fa}$ an echo transfer function in a far-end of the four-wire loop, $H_{ne}$ is an echo transfer function in a near-end of the four-wire loop, and $H_{co}$ is a transfer function in the non-adaptive filter part; and controlling the adaptive filter part by applying the determined coefficients thereto.

8. A method according to claim 7, wherein the step of determining coefficients includes limiting a sum of absolute values of coefficients ($\Sigma |b_\nu|$).

9. A method according to claim 7, wherein the step of determining coefficients includes limiting a weighted sum of absolute values of coefficients ($\Sigma |q_\nu {}^* b_\nu|$).

10. A method according to claim 7, wherein the step of determining coefficients includes limiting an absolute value of a sum of coefficients $[(\Sigma |b_\nu|)](|\Sigma b_\nu|)$.

11. A method according to claim 7, wherein the step of determining coefficients includes limiting an absolute value of a sum of products, the products comprising coefficients alternately multiplied by values equal to one and minus one ($|\Sigma \{b_\nu {}^*(-1)^\nu\}|$).

12. A method according to claim 7, wherein the step of determining includes reducing values of previously determined coefficients.

13. In a system including a four-wire loop coupled to an echo canceler, the echo canceler including an adaptive filter, a method for cancelling echoes in a signal without causing self-oscillation in the system, comprising the steps of:

applying the signal to the adaptive filter;

determining coefficients for use in the adaptive filter in a manner such that an absolute value of a filter transfer function, ($|H_{ca}|$), satisfies a relationship $|H_{ca}| < 1/|H_{fa}| - |H_{ne}|$, where $H_{fa}$ is an echo transfer function in a far-end of the four-wire loop and $H_{ne}$ is an echo transfer function in a near-end of the four-wire loop; and controlling the adaptive filter by applying the determined coefficients thereto.

14. A method according to claim 13, wherein the step of determining includes reducing values of previously determined coefficients.

15. A method according to claim 13, wherein the step of determining coefficients includes limiting a sum of absolute values of coefficients ($\Sigma |b_\nu|$).

16. A method according to claim 13, wherein the step of determining coefficients includes limiting a weighted sum of absolute values of coefficients ($\Sigma |q_\nu {}^* b_\nu|$).

17. A method according to claim 13 wherein the step of determining coefficients includes limiting an absolute value of a sum of coefficients ($|\Sigma b_\nu|$).

18. A method according to claim 13, wherein the step of determining coefficients includes limiting an absolute value of a sum of products, the products comprising coefficients alternately multiplied by values equal to one and minus one ($|\Sigma \{b_\nu {}^*(-1)^\nu\}|$).

19. In a system including a four-wire loop coupled to an echo canceler, the echo canceler including an adaptive filter part and a non-adaptive filter part, a method for cancelling echoes in a signal without causing self-oscillation in the system, comprising the steps of:

applying the signal to the adaptive filter;

determining coefficients for use in the adaptive filter part in a manner such that an absolute value of a transfer function, ($|H_{ca}|$), of the adaptive filter part satisfies a relationship $|H_{ca}| < 1/|H_{fa}| - |H_{ne} - H_{co}|$, where $H_{fa}$ is an echo transfer function in a far-end of the four-wire loop, $H_{ne}$ is an echo transfer function in a near-end of the four-wire loop, and $H_{co}$ is a transfer function in the non-adaptive filter part; and controlling the adaptive filter part by applying the determined coefficients thereto.

20. A method according to claim 19, wherein the step of determining includes reducing values of previously determined coefficients.

21. A method according to claim 19, wherein the step of determining coefficients includes limiting a sum of absolute values of coefficients ($\Sigma |b_\nu|$).

22. A method according to claim 19, wherein the step of determining coefficients includes limiting a weighted sum of absolute values of coefficients ($\Sigma |q_\nu {}^* b_\nu|$).

23. A method according to claim 19 wherein the step of determining coefficients includes limiting an absolute value of a sum of coefficients ($|\Sigma b_\nu|$).

24. A method according to claim 19, wherein the step of determining coefficients includes limiting an absolute value of a sum of products, the products comprising coefficients alternately multiplied by values equal to one and minus one ($|\Sigma \{b_\nu {}^*(-1)^\nu\}|$).

25. A communications system, comprising:

a four-wire loop;

an echo canceler, coupled to the four-wire loop, including an adaptive filter;

means for determining coefficients for use in the adaptive filter in a manner such that an absolute value of a filter transfer function, ($|H_{ca}|$), satisfies a relationship $|H_{ca}| < 1/|H_{fa}| - |H_{ne}|$, where $H_{fa}$ is an echo transfer function in a far-end of the four-wire loop and $H_{ne}$ is an echo transfer function in a near-end of the four-wire loop.

26. The communications system of claim 25, wherein the means for determining includes means for reducing values of previously determined coefficients.

27. The communications system of claim 25, wherein the means for determining coefficients includes means for limiting a sum of absolute values of coefficients ($\Sigma |b_\nu|$).

28. The communications system of claim 25, wherein the means for determining coefficients includes means for limiting a weighted sum of absolute values of coefficients ($\Sigma |q_\nu {}^* b_\nu|$).

29. The communications system of claim 25, wherein the means for determining coefficients includes means for limiting an absolute value of a sum of coefficients ($|\Sigma b_\nu|$).

30. The communications system of claim 25, wherein the means for determining coefficients includes means for limiting an absolute value of a sum of products, the products comprising coefficients alternately multiplied by values equal to one and minus one ($|\Sigma \{b_\nu {}^*(-1)^\nu\}|$).

31. A communications system, comprising:

a four-wire loop;

an echo canceler, coupled to the four-wire loop, including an adaptive filter part and a non-adaptive filter part;

means for determining coefficients for use in the adaptive filter part in a manner such that an absolute value of a transfer function, ($|H_{ca}|$), of the adaptive filter part satisfies a relationship $|H_{ca}| < 1/|H_{fa}| - |H_{ne} - H_{co}|$, where $H_{fa}$ is an echo transfer function in a far-end of the four-wire loop, $H_{ne}$ is an echo transfer function in a near-end of the four-wire loop, and $H_{co}$ is a transfer function in the non-adaptive filter part.

32. The communications system of claim 31, wherein the means for determining includes means for reducing values of previously determined coefficients.

33. The communications system of claim 31, wherein the means for determining coefficients includes means for limiting a sum of absolute values of coefficients ($\Sigma|b_\nu|$).

34. The communications system of claim 31, wherein the means for determining coefficients includes means for limiting a weighted sum of absolute values of coefficients ($\Sigma|q_\nu * b_\nu|$).

35. The communications system of claim 31, wherein the means for determining coefficients includes means for limiting an absolute value of a sum of coefficients ($|\Sigma b_\nu|$).

36. The communications system of claim 31, wherein the means for determining coefficients includes means for limiting an absolute value of a sum of products, the products comprising coefficients alternately multiplied by values equal to one and minus one ($|\Sigma\{b_\nu *(-1)^\nu\}|$).

* * * * *